UNITED STATES PATENT OFFICE.

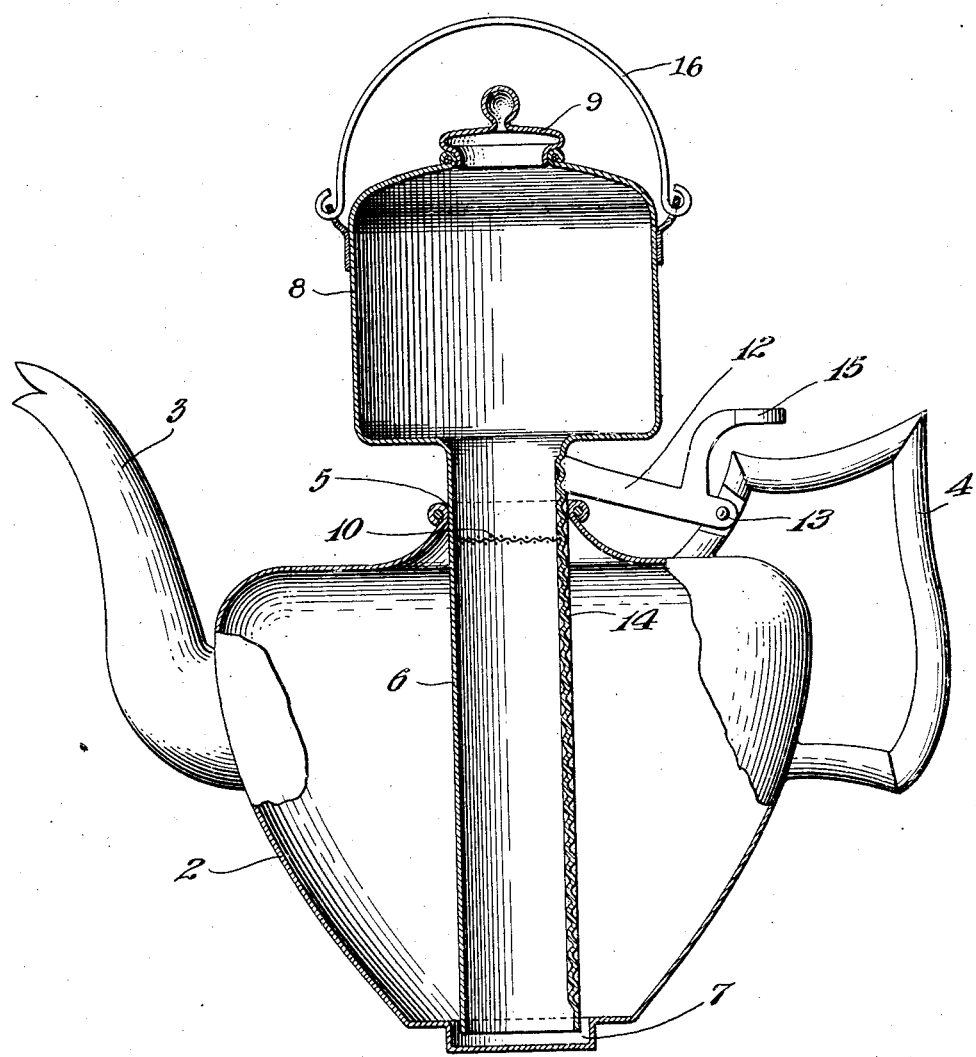

SYLVAN F. GUGGENHEIMER, OF RICHMOND, VIRGINIA.

COMBINATION TEA AND COFFEE POT.

1,360,935.

Specification of Letters Patent.    Patented Nov. 30, 1920.

Application filed August 15, 1919. Serial No. 317,795.

*To all whom it may concern:*

Be it known that I, SYLVAN F. GUGGENHEIMER, a citizen of the United States, residing at Richmond, in the county of Henrico and State of Virginia, have invented certain new and useful Improvements in Combination Tea and Coffee Pots; and I do hereby declare the following to be a full, clear, and exact description of the invention, such as will enable others skilled in the art to which it appertains to make and use the same.

This invention relates to a device for the making of tea, coffee and the like and particularly to a form of this apparatus in which there is a percolation of the fluid.

It is one of the objects of the present invention to provide a simple, practicable, substantial and relatively inexpensive apparatus for increasing the efficiency with which coffee, tea and other materials may be treated to produce a delectable beverage and especially to improve devices of this kind to secure the effective treatment of the substance so as to obtain the flavors therefrom in the best manner.

With the above and other objects in view as will be rendered manifest to those versed in the art the invention consists in the construction, the combination, and in details and arrangements of the parts as more particularly described thereinafter relative to the improvement of the invention illustrated in the accompanying drawings wherein:

The figure is a central, vertical, sectional view through the device.

In the preferred embodiment of the invention any suitably shaped and sized bearer or container may be utilized, here shown as in the form of a teapot 2 having the usual dispensing spout 3 at one side and a handle 4 at the opposite side, the top of the pot being open as at 5 to permit the ready insertion and removal of a tubular container or bowl 6 which is of sufficient length so that its lower end will project downwardly to the bottom of a recess or depression 7 formed in the bottom of the pot 2 forming a tight joint therewith. The bowl or body part 6 extends upwardly and is provided with a chamber 8 of somewhat larger diameter than the tubular body part 6 and this may be covered with any suitable form of removable cover as 9 to permit the insertion of the material to be treated into the chamber 8. This material is supported upon a transverse foraminous diaphragm 10 through which water can percolate from the upper chamber when the lower end of the tubular body 6 is elevated with respect to the seal forming basin 7 in which liquid will close the lower end of the tubular body 6 immersed therein. The substance being treated in the chamber 8 can be steeped to the desired length of time and then by lifting the chamber with the depending tubular portion 6 upwardly, the seal is broken and the liquid will percolate through the diaphragm 10 into the dispensing pot 2. Any suitable means may be utilized to maintain the percolating chamber at the desired elevated position with respect to the pot 2 and a simple form of such means is shown as comprising a pawl or latch 12 pivoted at 13 upon a convenient portion of the pot or handle and having its swinging edge designed to engage the adjacent surface of the neck or body portion 6. To increase the holding tendency of the pawl 12 one or the other of the contacting surfaces of the pawl and the tube 6 or both can be corrugated or suitably roughened as at 14 so that the latch will quickly take effect and securely support the percolating portion at any desired vertical position. To conveniently release the pawl 12 from engagement with the percolator tube 6 the pawl may be provided with the trigger-like portion 15 extending upwardly or conveniently for access by the server. By depressing the trigger 15, the pawl 12 may be elevated to a vertical position, allowing the tube 6 to descend and seat against the bottom of basin 7, forming a tight joint therewith.

On the top of the member holding chamber 8 is mounted a pivoted handle 16.

After the coffee or tea has been brewed a sufficient length of time in the percolator and the liquid has been released by the breaking of the seal 7 so that the brewed coffee has percolated through into the container 2, the percolator part 8 may be removed if desired and top 9 fitted into the opening of the container, or the entire apparatus may be placed on the table for service.

It is understood that the invention may be embodied in various shapes of devices and that the same can be altered and changed in details of construction within the spirit of the invention and the scope of the appended claims.

Having thus described my invention what I claim is:

1. A percolator comprising, first, a container having an opening in its top, and second, a container comprising a tubular body movable vertically in said opening, said tubular body having imperforate sides and an open lower end adapted to seat against the bottom of said first container so as to form a seal therewith, and a foraminous transverse wall in said second container located above the possible content level of said first container.

2. A percolating device comprising a container having an opening in its top, a second container having an open-mouthed tubular extension, slidable in the opening in the top and seating against the bottom of said first container to form a seal therewith and having a foraminous transverse wall above the possible content level of said first container, and means for adjustably securing said second container in elevated relation to said first member.

In testimony whereof I affix my signature.

SYLVAN F. GUGGENHEIMER.